Oct. 30, 1923.

A. C. MEYER 1,472,276

INTEREST CALCULATOR

Filed Dec. 11, 1922

INVENTOR.
Albert C. Meyer,
BY
ATTORNEY.

Oct. 30, 1923.
A. C. MEYER
INTEREST CALCULATOR
Filed Dec. 11, 1922
1,472,276
2 Sheets-Sheet 2
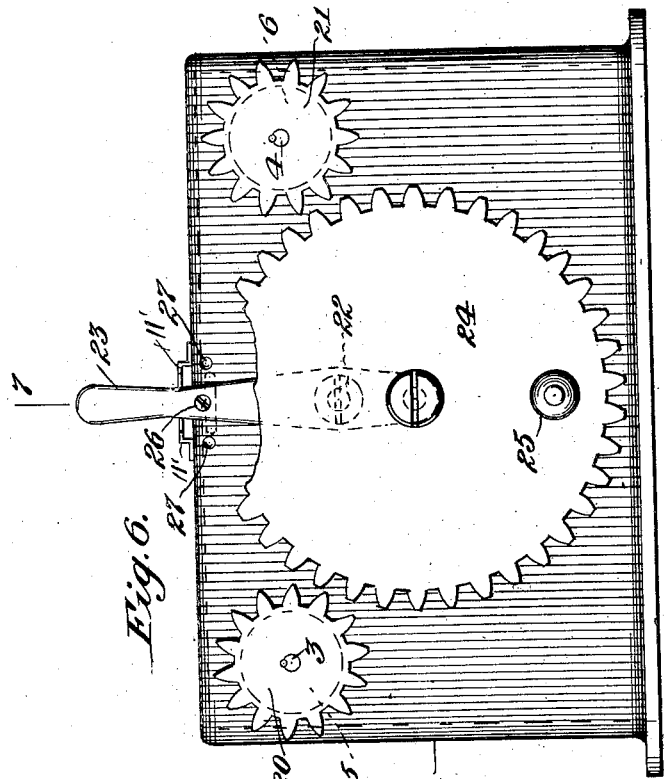
Inventor:
Albert C. Meyer,
Att'y.

Patented Oct. 30, 1923.

1,472,276

UNITED STATES PATENT OFFICE.

ALBERT C. MEYER, OF SAN DIEGO, CALIFORNIA.

INTEREST CALCULATOR.

Application filed December 11, 1922. Serial No. 606,160.

*To all whom it may concern:*

Be it known that I, ALBERT C. MEYER, a citizen of the United States, residing at Fort Stockton Drive, in the city of San Diego, in the county of San Diego and State of California, have invented a new and useful Interest Calculator, of which the following is a specification.

This invention relates to means for quickly determining interest and percentage, and some of the objects of my invention are: To provide interest or percentage tables in which the interest is ready calculated and arranged in double lines, one of the lines, preferably the upper, giving the interest and the other the principal opposite the number of months and days and the rate per cent; to provide these tables printed in convenient form; to provide a transparent slide bearing the decimal point and an opaque portion for stopping off the figures in the lines which are not required in determining the interest immediately required; to provide mechanism or apparatus for quickly and easily bringing the lines required under the slide and means for guiding the slide over the several columns of the tables; to provide apparatus or mechanism for these purposes which is comparatively inexpensive, easily manufactured, simple of construction and operation, durable, compact, occupying little room on the desk, and not easily deranged; to provide apparatus by means of which intricate interest problems may be determined easily and quickly even by one who is not skilled in calculation.

These and other objects I attain by means of the mechanism or apparatus illustrated in the accompanying drawings, in which:

Figure 1 is a top plan view.

Figure 2, a transverse section on the line 2—2 of Fig. 1.

Figure 3, an end view of the right-hand end of Fig. 1.

Figure 4, a fragmentary plan view of the interest table.

Figure 6 is an end elevation of another form of the machine with a different roll-operating mechanism from that shown in Figs. 1, 2, 3; and Figure 7 is a sectional end elevation of Fig. 6.

Similar reference characters refer to similar parts througout the several views of the drawings.

Figure 1:
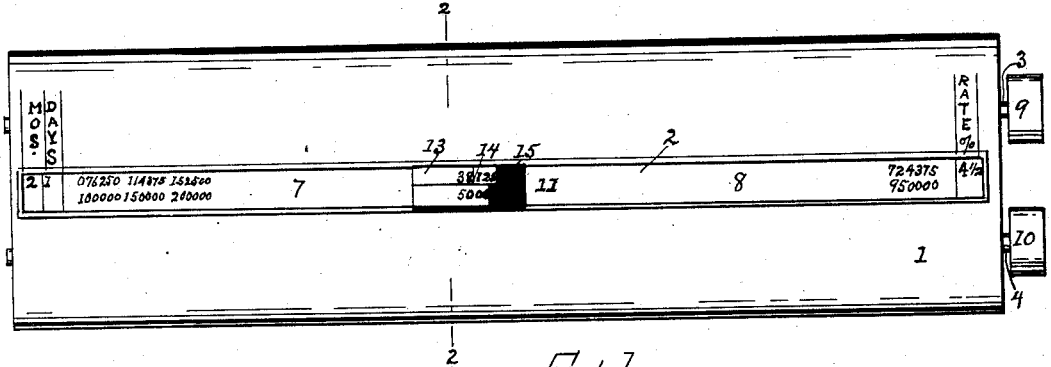

In the present embodiment of my invention a housing or case 1 is provided. This is formed with a rectangular opening 2 in the top of sufficient width to display two lines of figures therethrough. Journal openings are formed in the ends of the case 1 to receive shafts 3 and 4, upon which are mounted rolls 5 and 6, respectively, upon which is wound a sheet of paper or fabric 7, and upon this are printed the interest tables 8. Upon one end of the shafts 3 and 4, outside of case 1, are mounted knobs or hand wheels 9 and 10 for winding sheet 7 in either direction and bringing the required interest table 8 into register with opening 2. When sheet 7 is to be moved forward knob 9 is manipulated, and when sheet 7 is to be moved backward knob 10 is operated. Rolls 5 and 6 are provided with a little friction, in order that they may not spin and that strip 7 may be kept taut between the rolls.

The opening 2 is provided with a transparent window 11, under which is mounted a smooth table or platen 12, over which sheet 7 is threaded and which guides sheet 7 close up against window 11, in order that the interest tables 8 may be plainly shown and easily read. In the long edges of opening 2, over window 11, are formed guides 11', in which is mounted a transparent slide 13 after the manner of the slide of a slide rule, so that the slide may be moved across the vertical columns of interest tables 8.

The slide 13 is provided with a decimal point on a hair line, at 14, by which the proper interest is pointed off, and the slide is also formed with an opaque portion 15 by which all figures in the interest and principal lines in a column are stopped off except those of the principal and the corresponding interest required.

The interest or percentage tables 8 are preferably printed on the continuous strip of paper or fabric 7, adapting them to be wound back and forth upon the rolls 5 and 6 so as to bring the proper lines into register under window 11 and slide 13. The tables preferably comprise twenty-one columns. The first column indicates the number of months for which the interest is to be determined, the second column the number of days over the months, and the last column the rate per cent. The intermediate columns indicate sums of principal and corresponding interest ready calculated. The eighteen columns express sums of principal in horizontal lines across the sheet thus: 100000 150000 200000 250000 300000 350000 400000 450000 500000 550000 600000 650000 700000 750000 800000 850000 900000 950000. These figures are preferably printed in red. In the line above this are the figures which will give the computed interest when properly pointed off by the sliding decimal point 14. For example, let it be required to determine the interest on $5,000 for 2 months and 1 day at 4½%. The line of the tables for 2 months and 1 day at 4½% is moved under opening 2 by manipulating knobs 9 and 10. The slide 13 is then moved over 500000, so that the units and tens ciphers are stopped off, displaying 5000. The decimal point 14 will then be between 8 and 1 above, indicating the correct interest, $38.125. If it is required to ascertain the interest on $5,125.00, the interest on $5,000 is first found and written down; then for $100.00 in the first column is set down and finally for $25.00 is obtained in the 250000 column and the whole added. This is all easily and quickly accomplished without changing the interest tables.

Figure 5:
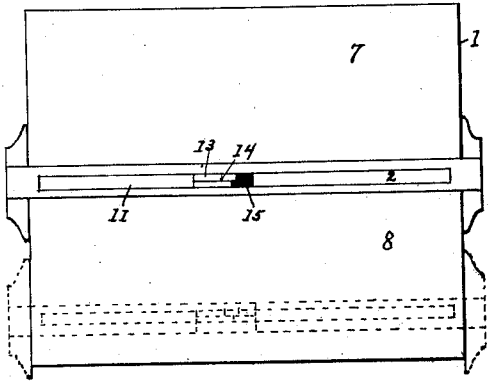
Figure 5 is a top plan view of a modification.

In the modification shown in Fig. 5 the case or support 1 may be a board or low box, and the interest tables 8 are in the form of separate sheets or cards, which are placed on the board or box, and the window or opening 2 is formed in a rule 2', which is adapted to be moved in parallel relation to the lines of figures on the interest table after the manner of a T square on a drawing board, as shown in dotted lines. The slide 13 is arranged to move in the opening 2 over window 11, as hereinbefore described.

Figure 2:
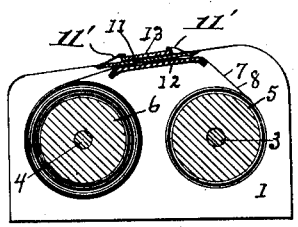
Figure 3:
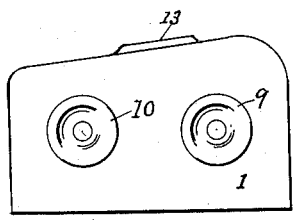
Figure 4:
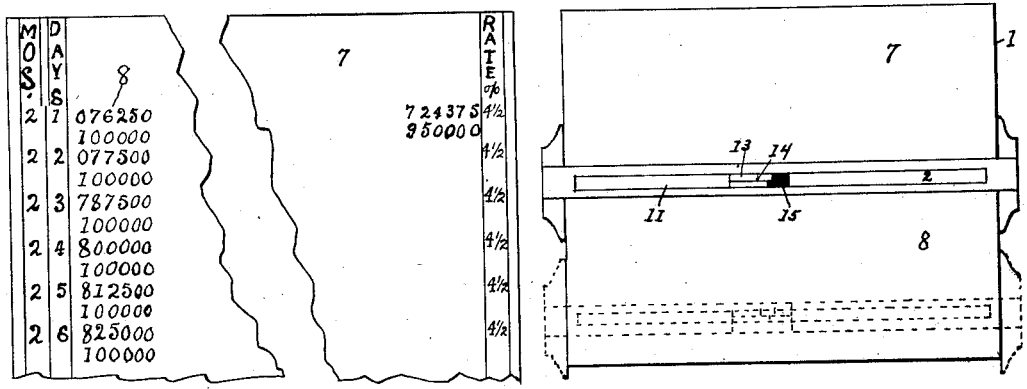

In Figs. 6 and 7 the casing 1, transverse top slot or opening 2, shafts 3, 4, rolls 5, 6, interest table sheet 7, 8, transparent window 11, platen 12, guides 11', slide 13, and decimal point 14 are the same as in Figs. 1 to 3, but I have provided a reversing gearing for actuating the shafts 3 and 4 and their rolls 5 and 6, as will now appear. Upon corresponding shaft ends are pinions 20, 21 respectively and intermediate of these pinions I pivot, near its lower end, as at 22, a vertically disposed lever 23 projecting at its upper handle forming end above the top of the casing. Upon the lower end of this swinging lever is journaled a large operating gear wheel 24 having a handle 25. This operating gear 24 is shown in Fig. 6 as out of mesh with both pinions 20, 21, but it may be thrown into mesh with either pinion by means of lever 23 and then rotated to operate the pinion and wind the interest table on the spool actuated from that pinion. A locking means for the upper end of lever 23 is provided and comprises a stud 26 in the form of a pointed set-screw which engages with any one of the several recesses 27 in the side of the casing 1 to lock the lever in its adjusted position. The winding of the interest table may be readily reversed by operating this single large gear instead of having to operate two separate hand wheels, as in Figs. 1 to 3.

What I claim is:

1. An interest calculator comprising a case or support, a principal and interest table comprising associated groups of figures indicating principals upon which interest is to be calculated and corresponding sums of interest computed thereon at a given rate of interest, a movable slide movable across said table for indicating the interest of a given principal, said slide being of a width to expose simultaneously one principal and one interest sum of every group as it is moved from group to group thereof, and having an opaque portion adapted to stop off all figures in any principal except those of the principal upon which the interest is to be computed, and a decimal point on said slide adapted to positively point off the proper amount of interest in the exposed associated interest figures.

2. An interest calculator, comprising a case or support, an interest table comprising vertical columns of alternating sums of principals and corresponding interest, and a slide for pointing off and indicating interest, said slide having an opening of a width to expose one principal and one interest sum, an opaque portion to stop off all figures in principal lines in a column except those of the principal upon which interest is to be computed, and a decimal pointer on the slide in proper relation to said opaque portion to positively point off the proper interest upon the exposed principal.

3. An interest calculator, comprising a case, a pair of rolls journaled in the case, a sheet containing interest tables mounted on the rolls, means for winding the sheet back and forth of the rolls, an opening being formed in the top of the case to expose two lines of the interest tables simultaneously, and a slide movable longitudinally of the said opening and having a stepped opaque portion for pointing off certain numbers in the lines of the interest tables on said sheet, and a decimal pointer to the left of said opaque portion to positively point off the proper interest.

4. In an interest calculator, a case or support, an interest table comprising vertical columns of alternating sums of principals and corresponding interest computed, and a transparent slide for pointing off and indicating interest; said slide being of a width to expose one principal and one interest sum as it is moved from group to group and provided with an opaque portion to stop off all figures in the principal lines in a column except those of the principal on which interest is to be computed, and a decimal pointer on the slide in proper relation to the opaque portion to positively point off the proper interest on the exposed figures of the principal.

5. An interest calculator comprising a case or support having a transverse opening from side to side, an interest table movable under said opening and comprising vertical columns of numbers of months, numbers of days, rates of interest and a series of vertical columns of alternating sums of principal and computed corresponding sums of interest for each sum of principal; said numbers of months, days, rates per cent being in line with the sums of interest, and a transparent slide movable from end to end of said transverse opening and of a width to expose one sum of principal and its corresponding interest sum; said slide having an opaque stop-off portion to stop off figures of principal upon which interest is not to be calculated, and a decimal pointer in its transparent portion to point off the interest on the exposed figures of the principal.

6. In an interest calculator, a decimal slide formed of transpicuous material of a width to expose a line of principal sums, and a line of computed sums and provided at one end with an opaque stop off portion and between its ends, in its transpicuous portion, with a decimal pointer in proper relation to the opaque portion for the purpose of pointing off the interest on the exposed figures of the principal.

7. In an interest calculator, an interest table comprising a sheet provided with vertical columns of numbers of months, numbers of days, rates of interest, and a series of vertical columns of alternating sums of principal and computed corresponding sums of interest for each sum of principal; said numbers of months, days, rates, per cent and sums of interest being in a horizontal line immediately under said sums of principal in combination with a decimal slide through which one principal and one interest sum are exposed; said slide provided with a stop off portion to stop off all figures in the said principal except those upon which interest is required and a decimal pointer on the slide in proper relation to said stop off portion to positively point off the proper interest.

ALBERT C. MEYER.